United States Patent [19]

Keske et al.

[11] Patent Number: 5,027,975

[45] Date of Patent: Jul. 2, 1991

[54] URETHANE FOAM GUN

[76] Inventors: David G. Keske, 1510 Page Ind. Blvd., St. Louis, Mo. 63132; Donald L. Kahmke, both of 12940 Bellefontaine, St. Louis, Mo. 63138

[21] Appl. No.: 450,471

[22] Filed: Dec. 14, 1989

[51] Int. Cl.⁵ ............................................. G01F 11/00
[52] U.S. Cl. .............................. 222/1; 222/132; 222/135; 222/145; 222/149; 222/485; 222/513
[58] Field of Search .................. 222/1, 145, 132, 135, 222/137, 141, 148, 149, 324, 389, 485, 501, 504, 514; 239/112, 113, 114, 115, 116, 117, 118, 414, 416; 251/77

[56] References Cited

U.S. PATENT DOCUMENTS

| D. 285,960 | 9/1986 | Keske | D23/17 |
| 3,687,370 | 8/1972 | Sperry | 239/117 |
| 3,945,569 | 3/1976 | Sperry | 239/117 |
| 4,099,673 | 7/1978 | Heath et al. | 239/416 |
| 4,159,079 | 6/1979 | Phillips, Jr. | 239/112 |
| 4,377,256 | 3/1983 | Commette et al. | 239/117 |
| 4,426,023 | 1/1984 | Sperry et al. | 222/132 |
| 4,469,251 | 9/1984 | Sperry et al. | 222/135 |
| 4,550,863 | 11/1985 | Farrey | 222/153 |
| 4,568,003 | 2/1986 | Sperry et al. | 222/145 |

Primary Examiner—Andres Kashnikow
Assistant Examiner—Philippe Derakshani
Attorney, Agent, or Firm—Sandler, Greenblum & Bernstein

[57] ABSTRACT

Dispensing gun for mixing and dispensing reactable fluent materials. A cylinder is slidable within a bore in response to a piston sliding within the cylinder. When the cylinder moves away from a discharge opening, orifices in the wall of the cylinder become aligned with supply passages in the bore allowing the reactable fluent materials to mix in the cylinder and be dispensed from the discharge opening. The cylinder, piston and orifices are cleaned by a cleaning solvent at the end of each dispensing operation. Movement of the piston towards the discharge opening draws the cleaning solvent through the orifices into the interior of the cylinder. The dispensing gun is particularly useful for mixing organic resins and polyisocyanates to dispense polyurethane foam.

47 Claims, 5 Drawing Sheets

URETHANE FOAM GUN

BACKGROUND OF THE INVENTION

1. Field of the Invention

This invention relates to a method and apparatus for mixing and dispensing fluids which react with each other. The mix cylinder, piston and orifices of a foam gun are flushed and cleaned at the end of each dispensing operation. The invention is particularly useful for mixing organic resins and polyisocyanates to dispense polyurethane foam. The dispensing gun may also dispense a single fluent material.

2. Description of Background and Relevant Information

The forming of synthetic foams, such as polyurethane foams, requires uniform mixing of liquid organic resins and polyisocyanates. A problem that occurs in such mixing is that the organic resin and polyisocyanate react relatively rapidly and accumulate over the surfaces of the dispensing apparatus. The foam increases in volume and may block passages within the foam gun and the feed hoses leading to the gun. This disables the foam gun, which must then be replaced, leading to downtime and excessive cost.

U.S. Pat. No. 4,426,023 to SPERRY et al. discloses a foam gun in which a cleaning assembly supplies a solvent to the discharge part of the foam gun and a valving rod of a piston travels through a solvent reservoir. This cleaning assembly cleans the discharge port and the valving rod but does not adequately clean the orifices through which the organic resins and polyisocyanates are supplied.

U.S. Pat. No. 4,159,079 to PHILLIPS, Jr. discloses a foam dispenser which includes gaskets to prevent the emigration of liquids from the mixing chamber. The mixing chamber is press fit inside the bore of the front section of the foam gun. The valving rod is bathed in a cleaning and/or lubricating solvent in a chamber.

U.S. Pat. No. 4,568,003 to SPERRY et al. discloses a foam dispenser in which the mixing chamber is detachable to facilitate cleaning.

SUMMARY OF THE INVENTION

An object of the present invention is to provide a foam gun in which a cleaning assembly circulates solvent to clean and flush the orifices and the interior of the cylinder without depending on interference fits in the sealing system.

This object is obtained by providing a dispensing gun for mixing and dispensing a plurality of reactable fluids having a housing including a first bore, which has an inner opening, a discharge opening, and a plurality of passages for supplying the reactable fluids. A mixing cylinder includes an inner opening, a discharge opening, and a plurality of fluid supplying orifices and is slidable in the first bore. A piston rod is movable through the inner opening of the first bore and the inner opening of the mixing cylinder towards and away from the discharge openings, whereby the mixing cylinder moves away from the discharge opening of the first bore in response to the movement of the piston rod away from the discharge openings, so that the plurality of passages for supplying the reactable fluids becomes aligned with the plurality of fluid supplying orifices to dispense the reactable fluids from the discharge openings.

According to another aspect of the invention, the housing includes a second bore which communicates with the inner opening of the first bore, and biasing means within the second bore for biasing the mixing cylinder towards the discharge opening of the first bore. The piston rod engages the mixing cylinder to move the mixing cylinder away from the discharge opening of the first bore. The mixing cylinder includes a restriction and the piston rod includes a shoulder. The shoulder engages the restriction to move the mixing cylinder away from the discharge opening of the first bore.

According to another aspect of the invention, the housing includes a third bore, which includes means for moving the piston rod. The means for moving the piston rod may be an air cylinder shaft connected to the piston rod, the air cylinder shaft being moved by compressed air. A trigger actuates the movement of the air cylinder shaft. The third bore includes an open end opening towards the first bore and the air cylinder shaft extends through the opening and is connected to the piston rod. A front air cylinder head seals the open end and the air cylinder shaft is slidable through the front air cylinder head.

According to still another aspect of the invention, the dispensing gun includes means for cleaning the mixing cylinder, which includes means for supplying cleaning solvent. At least one port in the housing communicates with a space between the inner surface of the first bore and the outer surface of the mixing cylinder. A source of cleaning solvent supplies cleaning solvent to a first port in the housing and a second port returns cleaning solvent to the source.

According to another aspect of the invention, sealing means are provided adjacent the plurality of fluid supplying orifices. The sealing means contacts the mixing cylinder and includes at least two seals. A pusher respectively pushes each seal against the mixing cylinder. An O-ring is provided between each seal and pusher, and a bolt contacts the pusher to adjust the force of the seal against the mixing cylinder.

The dispensing device may dispense a single fluid, and includes a housing including a first bore, which has an inner opening, a discharge opening, and a passage for supplying fluid. A cylinder has an inner opening, a discharge opening, and a fluid supplying orifice and is slidable in the first bore. A piston rod is movable through the inner opening of the first bore and the inner opening of the cylinder towards and away from the discharge openings, whereby the cylinder moves away from the discharge openings of the first bore in response to the movement of the piston rod away from the discharge openings, so that the passage for supplying fluid becomes aligned with the fluid supplying orifice to dispense the fluid from the discharge openings.

The housing includes a second bore which communicates with the inner opening of the first bore, and biasing means within the second bore for biasing the cylinder towards the discharge opening of the first bore. The piston rod engages the cylinder to move the cylinder away from the discharge opening of the first bore. The cylinder includes a restriction and the piston rod includes a shoulder, the shoulder engaging the restriction to move the cylinder away from the discharge opening of the first bore. The housing includes a third bore, which includes means for moving the piston rod.

According to another aspect of the invention, the dispensing device includes means for cleaning having means for supplying cleaning solvent to at least one port in the housing. A space exists between the inner surface of the first bore and the cylinder, and the port has one end communicating with the space. A source of cleaning solvent supplies cleaning solvent to a first port in the housing and a second port returns cleaning solvent to the source.

The dispensing device includes a housing including a first bore, having an interior surface, an inner opening, a discharge opening, and at least one passage for supplying fluid, a cylinder having an outer surface, an inner opening, a discharge opening, and at least one fluid supplying orifice, the cylinder being mounted in the first bore so that a space exists between the inner surface of the first bore and the outer surface of the cylinder, a piston rod being movable through the inner opening of the first bore and the inner opening of the cylinder towards and away from the discharge openings to allow fluent material to be dispensed from the discharge openings when the piston rod moves away from the discharge openings and uncovers the at least one fluid supplying orifice, and means for supplying cleaning solvent to the space between the inner surface of the first bore and the outer surface of the cylinder, so that when the piston rod moves towards the discharge openings, cleaning solvent is drawn through the at least one fluid supplying orifice to clean the orifice and the interior of the cylinder.

The means for supplying cleaning solvent includes at least one port in the housing, and more particularly a source of cleaning solvent, a first port for supplying cleaning solvent to the housing, and a second port for returning cleaning solvent to the source. It further comprises an O-ring on the piston rod to wipe the interior of the cylinder. A second bore communicates with the inner opening of the first bore and the means for supplying cleaning solvent supplies cleaning solvent to the second bore.

Another aspect of the invention is directed to a method of dispensing fluent material from a dispensing device including a bore having a discharge opening and at least one passage for supplying fluent material, a cylinder having a discharge opening and at least one fluid supplying orifice and being slidable within the first bore, and a piston rod being slidable within the cylinder where the method includes the steps of sliding the piston rod in a direction away from the discharge openings and engaging the cylinder by the piston rod to move the cylinder in a direction away from the discharge opening of the bore so that the at least one passage and the at least one fluid supplying orifice are aligned to allow the fluent material to flow from the at least one passage through the at least one fluid supplying orifice to be dispensed through the discharge openings.

The method further includes bissing the cylinder towards the discharge opening of the bore.

The method of dispensing fluent material can also include supplying at least two fluent materials to the cylinder, and dispensing the mixture of the fluent materials through the discharge openings.

Cleaning solvent is supplied to clean the at least one fluid supplying orifice and the cylinder by moving the piston rod in a direction towards the discharge opening of the bore to draw cleaning solvent through the at least one fluid supplying orifice. The cleaning solvent may be continuously supplied.

The method of cleaning a dispensing device having a housing including a bore having a discharge opening and at least one passage for supplying fluent material, a cylinder having a discharge opening and at least one fluid supplying orifice and being mounted in the bore so that a space exists between the inner surface of the bore and the outer surface of the cylinder, and a piston rod being slidable within the cylinder, includes the steps of supplying cleaning solvent to the space between the inner surface of the bore and the cylinder; and sliding the piston rod towards the discharge openings to draw cleaning solvent through the at least one fluid supplying orifices and the interior of the cylinder. The cleaning solvent is supplied to the space through at least one port in the housing. More particularly, the cleaning solvent is supplied from a source to a first port in the housing and returned to the source from a second port in the housing. The cleaning solvent is continuously supplied to the space. The method of cleaning a dispensing device further includes wiping the interior of the cylinder by an element attached to the piston rod. The element may be an O-ring attached to the piston rod.

BRIEF DESCRIPTION OF THE DRAWINGS

The invention is further explained in the description which follows with reference to the drawings illustrating, by way of a non-limiting example, an embodiment of the invention wherein.

DETAILED DESCRIPTION OF THE PREFERRED EMBODIMENTS

Figure 1:
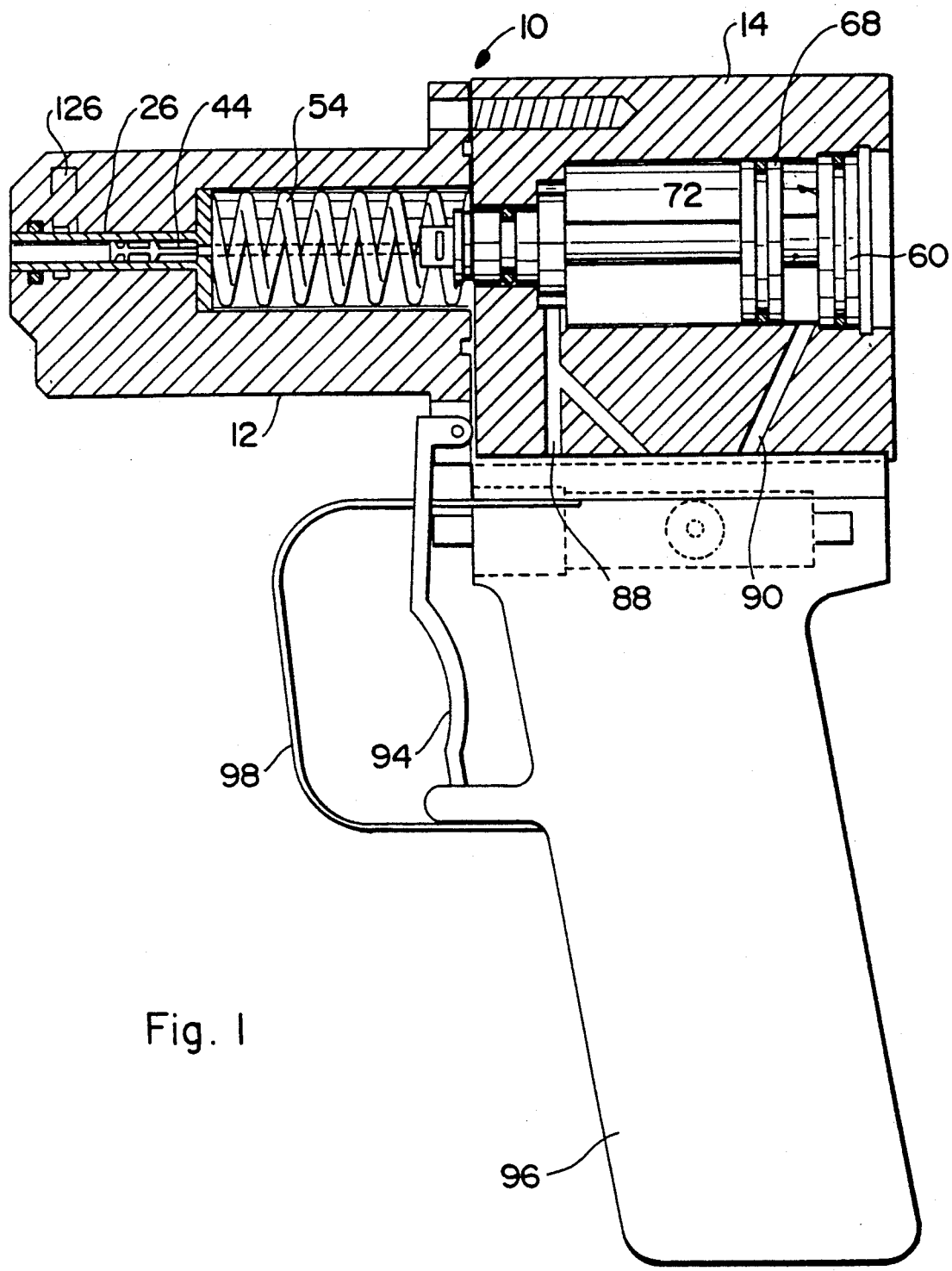
FIG. 1 is a cross-sectional view of the foam gun.
Figure 2:
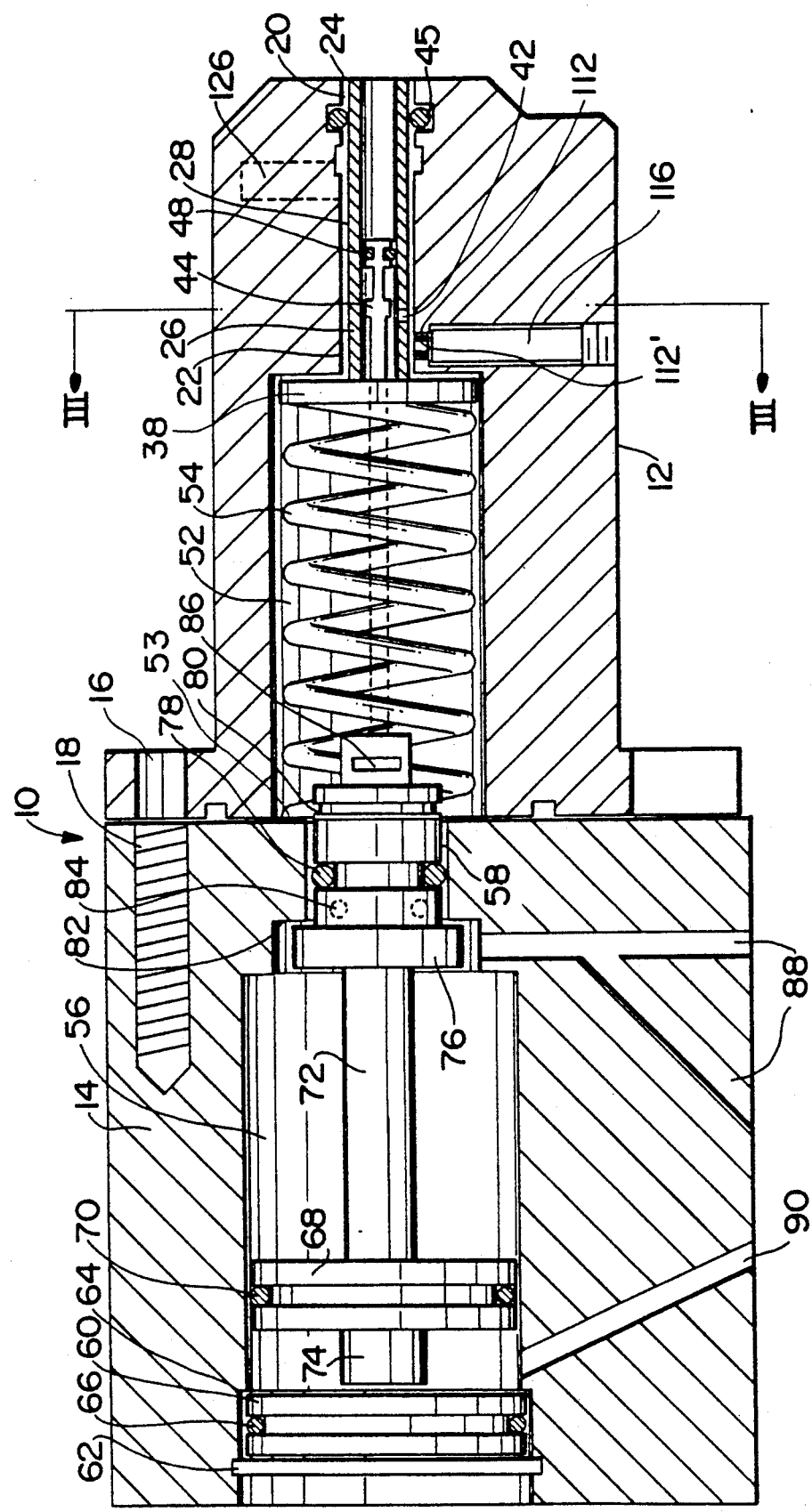
FIG. 2 is an enlarged cross-sectional view of the foam gun, taken along line II—II of FIG. 3.

Referring first to FIGS. 1 and 2, the foam gun of the present invention includes a housing 10, which includes a nose portion 12 connected to an air cylinder portion 14 by screws or like fasteners connected through holes 16 and 18 in the nose portion and air cylinder portion, respectively. This allows the housing portions to be easily assembled and disassembled for maintenance and cleaning.

Figure 6:
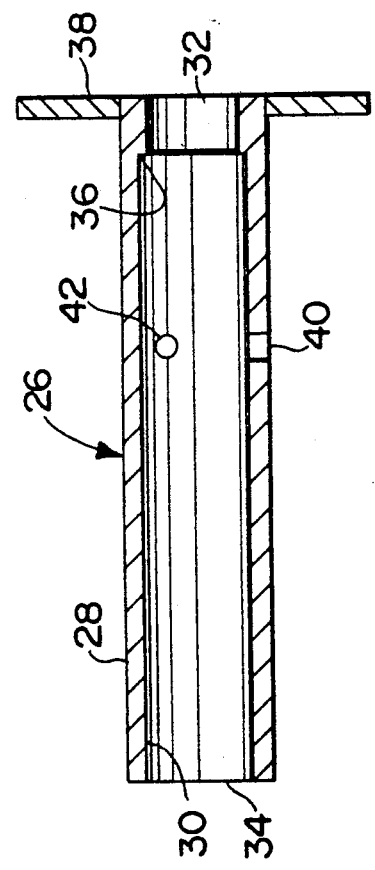
FIG. 6 is a view of the mix cylinder.

Nose portion 12 includes a first bore 20 which includes an inner end 22 and a discharge end 24. Mixing cylinder 26 is slidable within first bore 20. The mixing cylinder includes outer surface 28, inner surface 30, inner end 32, and discharge end 34 (see FIG. 6). A restriction 36 is formed in the interior of mixing cylinder 26 and an abutment surface 38 is formed at inner end 32. Spaced reactant fluid supplying orifices 40 and 42 extend through the inner and outer surfaces of mixing cylinder 26. An O-ring 45 seals mixing cylinder 26 with respect to first bore 20.

Figure 4:
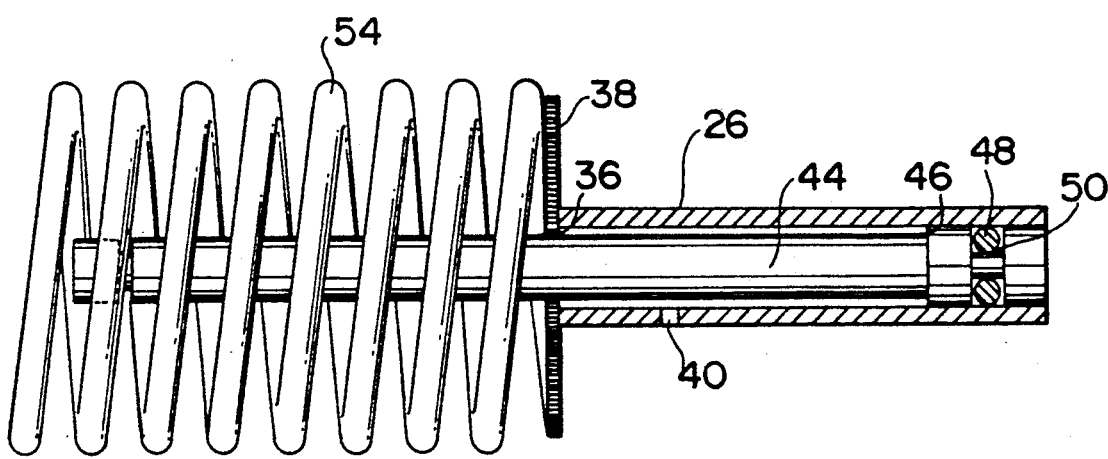
FIG. 4 is a detailed view showing the relationship between the mix cylinder, the piston rod and the return spring.
Figure 5:
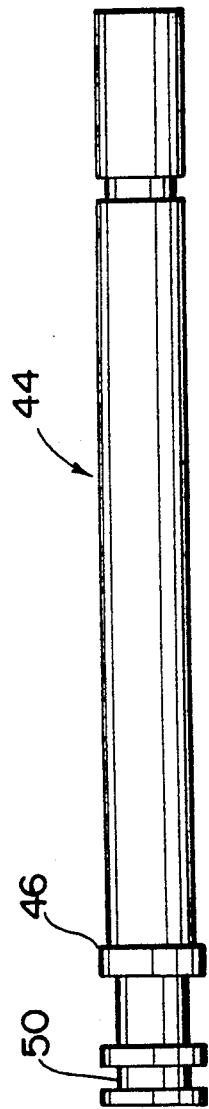
FIG. 5 is a view of the piston rod.

Referring particularly to FIGS. 2, 4, and 5, piston rod 44 slides within mixing cylinder 26. Piston rod 44 includes shoulder 46 for engagement with restriction 36 of mixing cylinder 26, as will be described in detail below. O-ring 48 fits in groove 50 to seal the piston rod with respect to mixing cylinder 26.

As shown in FIGS. 1 and 2, nose portion 12 includes second bore 52 having an abutment wall 53 at one end whose other end communicates with first bore 20 at inner end 22. Return spring 54 is mounted within second bore 52 and abuts against abutment wall 53 at one end and abutment surface 38 of mixing cylinder 26 at the other end.

Air cylinder portion 14 includes third bore 56 which communicates with second bore 52 through passage 58. Third bore 56 includes rear cylinder head 60 to seal the outer end of third bore 56. Rear cylinder head 60 is held between snap ring 62 and a shoulder 64 at the rear end of third bore 56. O-ring 66 is also secured to rear cylinder head 60.

Air cylinder piston 68 includes O-ring 70 and is slidable within third bore 56. Air cylinder shaft 72 is connected to air cylinder piston 68 by fastener 74, which may be a socket head bolt or the like. Front air cylinder head 76 is held within passage 58 by snap ring 80 and shoulder 82. Air cylinder head O-ring 78 seals front air cylinder head 76 with respect to passage 58. Air cylinder shaft O-ring 84 is associated with front air cylinder head 76. Air cylinder shaft 72 extends through and is slidable relative to front air cylinder head 76 and is sealed with respect thereto by O-ring 84. Air cylinder shaft 72 is connected to piston rod 44 by snap ring connector 86.

Figure 8:
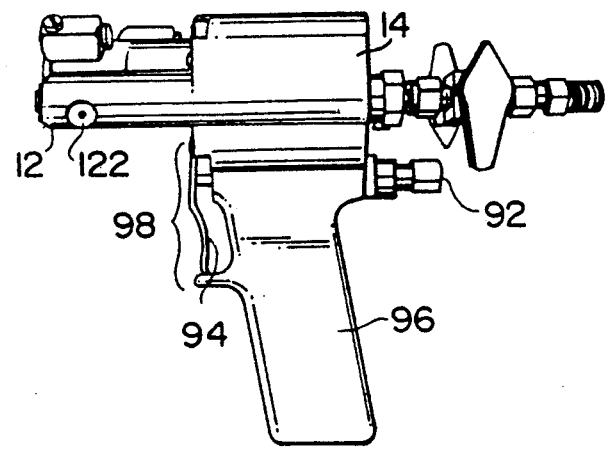
FIG. 8 is a side view of the foam gun.

Air supply passages 88 and air return passage 90 extend through air cylinder portion 14 into third bore 56. Compressed air is supplied to air supply passages 88 through air supply port 92 (see FIG. 8) from a compressed air supply source (not shown) in a conventional manner. Trigger 94 is actuated to direct compressed air through air supply passages 88 in a known manner to move air cylinder piston 68 to the right as seen in FIG. 1. The foam gun also includes handle 96 and trigger guard 98.

The foam gun includes a pair of inlet terminals 100, 102 which supply reactable fluids to mixing cylinder 26. Inlet hoses (not shown) from fluid sources are connected to the inlet terminals as is known in the art. The reactable fluids may be organic resins and polyisocyanates which react with each other to form polyurethane foam. Inlet terminals 100 and 102 lead to respective inlet passages 110a, 112a which open to first bore 20.

Figure 3:
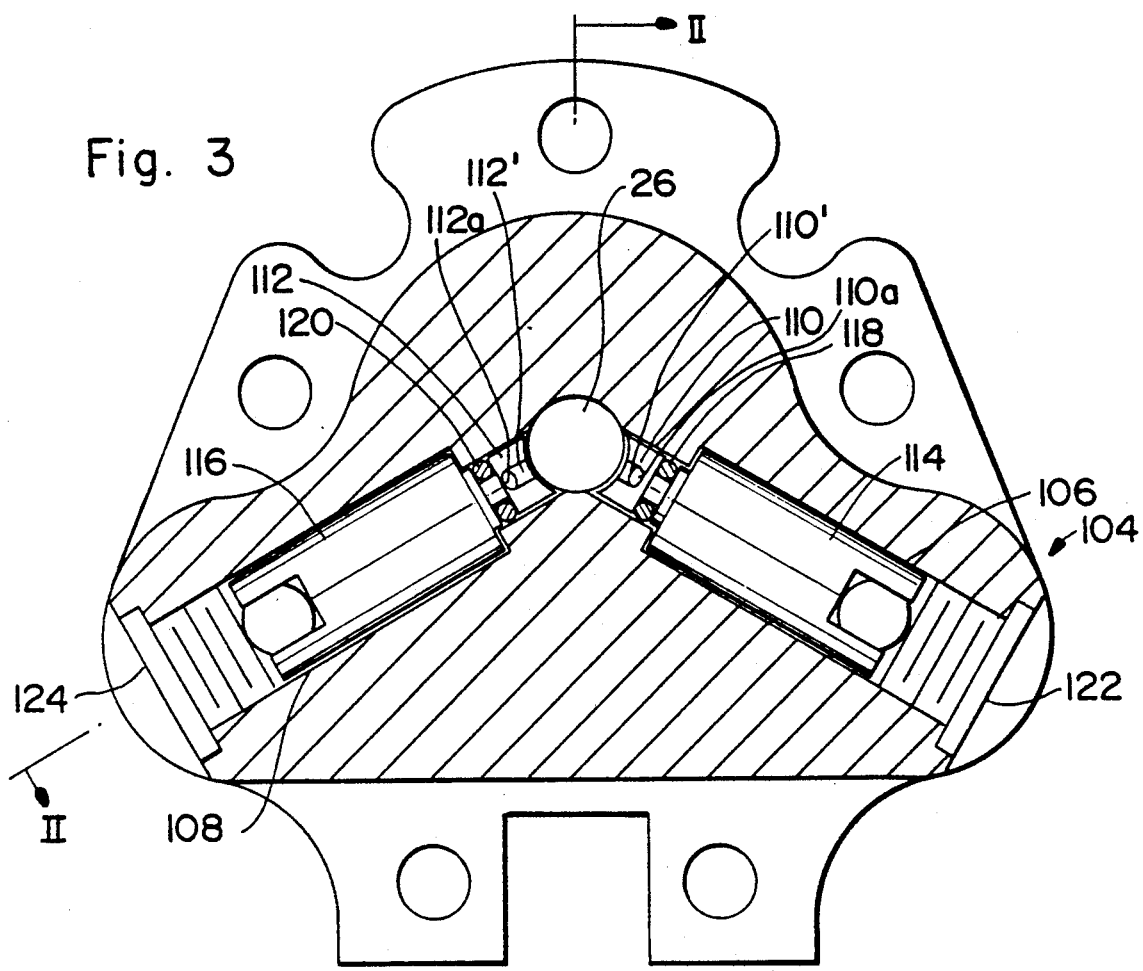
FIG. 3 is a cross-sectional view of the housing, taken along line III—III of FIG. 2.

As illustrated in FIGS. 2 and 3, sealing arrangement 104 is located in nose portion 12 adjacent the inlet passages. The sealing arrangement 104 includes a pair of radially extending unaligned bores 106 and 108. A pair of seals 110 and 112 are located within respective bores and contact mixing cylinder 26. A pair of pushers 114 and 116 apply force against each seal through respective compression rings 118 and 120. Threaded plugs 122 and 124 are inserted into the respective bores to adjustably apply a force to the respective pushers. Holes 110', 112' are located in seals 110 and 112, respectively, and communicate with inlet passages 110a, 112a, respectively.

Figure 7:
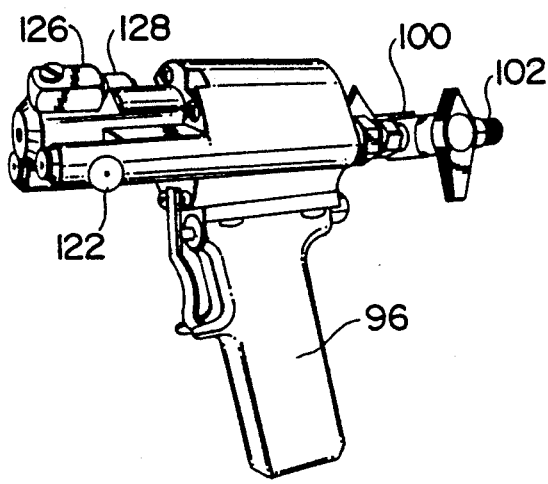
FIG. 7 is a perspective view of the foam gun.
Figure 9:
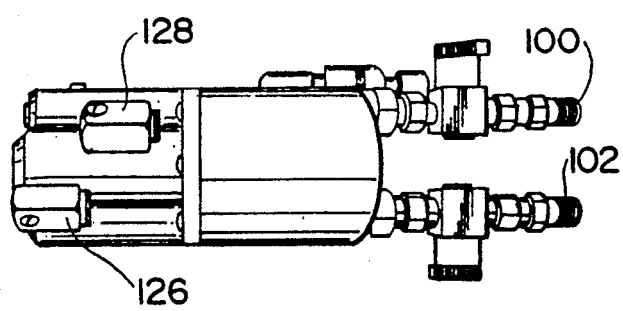
FIG. 9 is a top view of the foam gun.

An arrangement is also provided for supplying cleaning solvent to nose portion 12 to clean piston rod 44, mixing cylinder 26, orifices 40, 42, first bore 20, and second bore 52. Supply and return ports 126 and 128 (see FIGS. 7 and 9) are connected to the top of nose portion 12 to supply and circulate a cleaning solvent from a source (not shown). A pump may be used to apply pressure to continuously circulate the cleaning solvent throughout the nose portion.

As can be seen in FIG. 2, there is a gap or space between outer surface 28 of mixing cylinder 26 and the inner surface of first bore 20. Cleaning solvent flows through the supply port, the gap, the orifices and the second bore as will be described below.

The operation of the foam gun of the present invention will now be described with particular reference to FIGS. 2 and 4. When the trigger is pulled, compressed air flows through air supply passages 88 to move air cylinder piston 68 to the left. Since piston rod 44 is connected to air cylinder shaft 72, piston rod 44 also moves to the left within mixing cylinder 26 as seen in FIG. 2. At the end of the travel of piston rod 44 in mixing cylinder 26, shoulder 46 engages restriction 36 and pulls the mixing cylinder to the left against the force of return spring 54, allowing alignment of orifices 40 and 42 with the holes 110', 112' in the seals 110, 112, respectively, and consequently alignment with the inlet passages 110a, 112a for the reactable fluids. The fluids react in the mixing cylinder and polyurethane foam is dispensed from discharge end 24.

When pressure is relieved from the trigger, air flows through passage 90, forcing air cylinder piston 68 and piston rod 44 to the right. At the same time, return spring 54 forces mixing cylinder 26 to the right to bring the orifices 40 and 42 out of alignment with the inlet passages 110a, 112a to shut off flow of the reactable fluids to the mixing cylinder.

As described above, the cleaning solvent continuously circulates within nose portion 12 of the housing. As piston rod 44 moves to the right, O-ring 48 wipes the inner surface of the mixing cylinder and creates a vacuum to pull cleaning solvent from the space between the mixing cylinder and the inner surface of the first bore through orifices 40 and 42 into the mixing cylinder to thereby flush and clean the orifices and the inner surfaces of the mixing cylinder.

The housing may be machined from aluminum bar stock and the mixing cylinder, piston rod, and cylinder shaft may be steel. The seals may be made from "Teflon".

As can be seen, the present invention does not depend on interference fits for the sealing system. The housing is easily assembled and disassembled and the cleaning system cleans and flushes the mixing cylinder and orifices each time the trigger is released.

Although the invention has been described with reference to particular means, materials and embodiments, it is to be understood that the invention is not limited to the particulars disclosed and extends to all equivalents within the scope of the claims.

We claim:

1. A dispensing gun for mixing and dispensing a plurality of reactable fluids, said dispensing gun comprising:
   a) a housing including a first bore, said first bore having an inner opening, a discharge opening and a plurality of passages for supplying the reactable fluids;
   b) a mixing cylinder having an inner opening, a discharge opening, and a plurality of fluid supplying orifices, said mixing cylinder being slidable in said first bore; and
   c) a piston rod being movable through said inner opening of said first bore and said inner opening of said mixing cylinder towards and away from said discharge openings;
   whereby said mixing cylinder moves away from said discharge opening of said first bore in response to the movement of said piston rod away from said discharge openings, so that said plurality of passages for supplying the reactable fluids becomes aligned with said plurality of fluid supplying orifices to dispense said reactable fluids from said discharge openings.

2. The dispensing gun according to claim 1, wherein said housing includes a second bore which communicates with the inner opening of said first bore, and biasing means within said second bore for biasing said mixing cylinder towards the discharge opening of said first bore.

3. The dispensing gun according to claim 1, wherein said piston rod engages said mixing cylinder to move said mixing cylinder away from the discharge opening of said first bore.

4. The dispensing gun according to claim 3, wherein said mixing cylinder includes a restriction and said piston rod includes a shoulder, said shoulder engaging said restriction to move said mixing cylinder away from the discharge opening of said first bore.

5. The dispensing gun according to claim 1, wherein said housing includes a third bore, said third bore including means for moving said piston rod.

6. The dispensing gun according to claim 5, wherein said means for moving said piston rod comprises an air cylinder shaft connected to said piston rod, said air cylinder shaft being moved by compressed air.

7. The dispensing gun according to claim 6, further comprising a trigger to actuate the movement of said air cylinder shaft.

8. The dispensing gun according to claim 1, further comprising means for cleaning said mixing cylinder.

9. The dispensing gun according to claim 8, wherein said means for cleaning includes means for supplying cleaning solvent.

10. The dispensing gun according to claim 9, wherein said means for supplying cleaning solvent includes at least one port in said housing.

11. The dispensing gun according to claim 10, comprising a space between the inner surface of said first bore and the outer surface of said mixing cylinder, said at least one port having one end communicating with said space.

12. The dispensing gun according to claim 10, comprising a source of cleaning solvent, a first port for supplying cleaning solvent to said housing, and a second port for returning cleaning solvent to said source.

13. The dispensing gun according to claim 6, wherein said third bore includes an open end opening towards said first bore, said air cylinder shaft extending through said opening and being connected to said piston rod.

14. The dispensing gun according to claim 13, further comprising a front air cylinder head sealing said open end, said air cylinder shaft being slidable through said front air cylinder head.

15. The dispensing gun according to claim 1, further comprising sealing means adjacent said plurality of fluid supplying orifices.

16. The dispensing gun according to claim 15, wherein said sealing means contacts said mixing cylinder.

17. The dispensing gun according to claim 16, wherein said sealing means comprises at least two seals.

18. The dispensing gun according to claim 17, further comprising a pusher for respectively pushing each seal against said mixing cylinder.

19. The dispensing gun according to claim 18, further comprising an O-ring between each seal and pusher.

20. The dispensing gun according to claim 18, further comprising a bolt for contacting said pusher to adjust the force of said seal against said mixing cylinder.

21. A dispensing device for dispensing a fluid, said dispensing device comprising:
a) a housing including a first bore, said first bore having an inner opening, a discharge opening, and a passage for supplying fluid;
b) a cylinder having an inner opening, a discharge opening, and a fluid supplying orifice, said cylinder being slidable in said first bore; and
c) a piston rod being movable through the inner opening of said first bore and the inner opening of said cylinder towards and away from said discharge openings;
whereby said cylinder moves away from said discharge openings of said first bore in response to the movement of said piston rod away from said discharge openings, so that said passage for supplying fluid becomes aligned with said fluid supplying orifice to dispense the fluid from said discharge openings.

22. The dispensing device according to claim 21, wherein said housing includes a second bore which communicates with the inner opening of said first bore, and biasing means within said second bore for biasing said cylinder towards the discharge opening of said first bore.

23. The dispensing device according to claim 21, wherein said piston rod engages said cylinder to move said cylinder away from the discharge opening of said first bore.

24. The dispensing device according to claim 23, wherein said cylinder includes a restriction and said piston rod includes a shoulder, said shoulder engaging said restriction to move said cylinder away from the discharge opening of said first bore.

25. The dispensing device according to claim 21, wherein said housing includes a third bore, said third bore including means for moving said piston rod.

26. The dispensing device according to claim 21, further comprising means for cleaning said cylinder.

27. The dispensing device according to claim 26, wherein said means for cleaning includes means for supplying cleaning solvent.

28. The dispensing device according to claim 27, wherein said means for supplying cleaning solvent includes at least one port in said housing.

29. The dispensing device according to claim 28, comprising a space between the inner surface of said first bore and said cylinder, said at least one port having one end communicating with said space.

30. The dispensing device according to claim 28, comprising a source of cleaning solvent, a first port for supplying cleaning solvent to said housing, and a second port for returning cleaning solvent to said source.

31. A dispensing device for dispensing fluent material, said dispensing device comprising:
a) a housing including a first bore, said first bore having an interior surface, an inner opening, a discharge opening, and at least one passage for supplying fluid;
b) a cylinder having an outer surface, an inner opening, a discharge opening, and at least one fluid supplying orifice, said cylinder being mounted in said first bore so that a space exists between said inner surface of said first bore and said outer surface of said cylinder;

c) a piston rod being movable through the inner opening of said first bore and the inner opening of said cylinder towards and away from said discharge openings to allow fluent material to be dispensed from said discharge openings when said piston rod moves away from said discharge openings and uncovers said at least one fluid supplying orifice; and d) means for supplying cleaning solvent to said space between said inner surface of said first bore and said outer surface of said cylinder, so that when said piston rod moves towards said discharge openings, cleaning solvent is drawn through said at least one fluid supplying orifice to clean said orifice and the interior of said cylinder.

32. The dispensing device according to claim 31, wherein said means for supplying cleaning solvent includes at least one port in said housing.

33. The dispensing device according to claim 32, comprising a source of cleaning solvent, a first port for supplying cleaning solvent to said housing, and a second port for returning cleaning solvent to said source.

34. The dispensing device according to claim 31, further comprising an O-ring on said piston rod to wipe the interior of said cylinder.

35. The dispensing device according to claim 31, further comprising a second bore which communicates with the inner opening of said first bore, said means for supplying cleaning solvent supplying cleaning solvent to said second bore.

36. A method of dispensing fluent material from a dispensing device including a bore having a discharge opening and at least one passage for supplying fluent material, a cylinder having a discharge opening and at least one fluent material supplying orifice and being slidable within said first bore, and a piston rod being slidable within said cylinder, said method comprising the steps of:

a) sliding said piston rod in a direction away from said discharge openings; and b) engaging said cylinder by said piston rod to move said cylinder in a direction away from said discharge opening of said bore so that said at least one passage and said at least one fluent material supplying orifice are aligned to allow the fluent material to flow from said at least one passage through said at least one fluent material supplying orifice to be dispensed through said discharge openings.

37. The method of dispensing fluent material according to claim 36, further comprising biasing said cylinder towards said discharge opening of said bore.

38. The method of dispensing fluent material according to claim 36, comprising supplying at least two fluent materials to said cylinder, and dispensing the mixture of the fluent materials through said discharge openings.

39. The method of dispensing fluent material according to claim 36, comprising supplying cleaning solvent to clean said at least one fluent material supplying orifice and said cylinder.

40. The method of dispensing fluent material according to claim 39, comprising moving said piston rod in a direction towards said discharge opening of said bore to draw cleaning solvent through said at least one fluent material supplying orifice.

41. The method of dispensing fluent material according to claim 39, wherein the cleaning solvent is continuously supplied.

42. A method of cleaning a dispensing device having a housing including a bore having a discharge opening and at least one passage for supplying fluent material, a cylinder having a discharge opening and at least one fluent material supplying orifice and being mounted in said bore so that a space exists between the inner surface of said bore and the outer surface of said cylinder, and a piston rod being slidable within said cylinder, said method comprising the steps of:

a) supplying cleaning solvent to said space between the inner surface of said bore and said cylinder; and b) sliding said piston rod towards said discharge openings to draw cleaning solvent through said at least one fluent material supplying orifice and the interior of said cylinder.

43. The method of cleaning a dispensing device according to claim 42, wherein the cleaning solvent is supplied to said space through at least one port in said housing.

44. The method of cleaning a dispensing device according to claim 43, wherein the cleaning solvent is supplied from a source to a first port in the housing and returned to the source from a second port in the housing.

45. The method of cleaning a dispensing device according to claim 44, wherein the cleaning solvent is continuously supplied to said space.

46. The method of cleaning a dispensing device according to claim 42, further comprising wiping the interior of said cylinder by an element attached to said piston rod.

47. The method of cleaning a dispensing device according to claim 42, further comprising wiping the interior of said cylinder by an O-ring attached to said piston rod.

* * * * *

UNITED STATES PATENT AND TRADEMARK OFFICE
CERTIFICATE OF CORRECTION

PATENT NO. : 5,027,975

DATED : July 2, 1991

INVENTOR(S) : D. KESKE et al.

It is certified that error appears in the above-identified patent and that said Letters Patent is hereby corrected as shown below:

On the cover page of the printed patent, under "[76] Inventors", before "both of" add --Donald R. Kahmker--.

At column 3, line 54, of the printed patent, change "bissing" to ---biasing---.

Signed and Sealed this

Twenty-seventh Day of April, 1993

Attest:

MICHAEL K. KIRK

*Attesting Officer*      Acting Commissioner of Patents and Trademarks